(12) United States Patent
Nakahara

(10) Patent No.: US 6,958,831 B1
(45) Date of Patent: Oct. 25, 2005

(54) IMAGE SCANNING METHOD AND APPARATUS THEREOF

(75) Inventor: Kouji Nakahara, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/399,284

(22) Filed: Sep. 17, 1999

(30) Foreign Application Priority Data

Sep. 19, 1998 (JP) .......................................... 10-264246

(51) Int. Cl.$^7$ .............................................. H04N 1/04
(52) U.S. Cl. ...................... 358/474; 358/527; 358/486; 358/450; 382/318; 382/319
(58) Field of Search ................. 358/527, 505, 358/506, 518, 474, 497, 494, 412, 450, 486, 451, 401, 444, 453; 382/319, 318, 313, 299

(56) References Cited

U.S. PATENT DOCUMENTS

| | | | |
|---|---|---|---|
| 4,656,524 A | * 4/1987 | Norris et al. | 358/401 |
| 5,270,839 A | * 12/1993 | Parulski et al. | 358/474 |
| 5,295,204 A | * 3/1994 | Parulski | 358/527 |
| 5,301,244 A | * 4/1994 | Parulski | 358/512 |
| 5,559,936 A | * 9/1996 | Poulter et al. | 707/1 |
| 5,937,112 A | * 8/1999 | Herregods et al. | 382/474 |
| 6,359,706 B1 | * 3/2002 | Arita et al. | 358/486 |
| 6,650,442 B1 | * 11/2003 | Chiu | 358/474 |

FOREIGN PATENT DOCUMENTS

| | | |
|---|---|---|
| JP | 63-196983 | 8/1988 |
| JP | 1-91569 | 4/1989 |
| JP | 1-126718 | 5/1989 |

OTHER PUBLICATIONS

Japanese Office Action issued Mar. 31, 2000 in a related application with English translation of relevant portions.

* cited by examiner

Primary Examiner—Cheukfan Lee
(74) Attorney, Agent, or Firm—Dickstein, Shapiro, Morin & Oshinsky, L.L.P.

(57) ABSTRACT

At a conventional image scanning method, it takes long time to transfer an image data of whole image, consequently it takes long time to display the whole image on a display. Therefore, an image scanning method and an apparatus thereof, with which a user can recognize mistakes at reading a document at earlier time, are provided. By one time scanning, an image data whose resolution is lower than fundamental resolution is read. The image data of lower resolution is obtained by that the image data are thinned out. And this image data having lower resolution is displayed on a display as a preview image. By rescanning, an image whose resolution is higher than the preview image is read and displayed. This preview image can be displayed in short time, therefore the user can recognize a mistake at earlier time.

9 Claims, 5 Drawing Sheets

| A11 | B11 | A12 | B12 |
|-----|-----|-----|-----|
| C11 | D11 | C12 | D12 |
| A21 | B21 | A22 | B22 |
| C21 | D21 | C22 | D22 |

DOCUMENT

FIG. 2B

SIZE OF 1 BLOCK
(mnth BLOCK)

| Amn | Bmn |
|-----|-----|
| Cmn | Dmn |

CASE: 2×2 PIXELS

| 1 | 4 |
|---|---|
| 3 | 2 |

FIG. 4B

CASE: 4×4 PIXELS

| 1  | 13 | 4  | 16 |
|----|----|----|----|
| 9  | 5  | 12 | 8  |
| 3  | 15 | 2  | 14 |
| 11 | 7  | 10 | 6  |

FIG. 4C

CASE: 8×8 PIXELS

| 1  | 49 | 13 | 61 | 4  | 52 | 16 | 64 |
|----|----|----|----|----|----|----|----|
| 33 | 17 | 45 | 29 | 36 | 20 | 48 | 32 |
| 9  | 57 | 5  | 53 | 12 | 60 | 8  | 56 |
| 41 | 25 | 37 | 21 | 44 | 28 | 40 | 24 |
| 3  | 51 | 15 | 63 | 2  | 50 | 14 | 62 |
| 35 | 19 | 47 | 31 | 34 | 18 | 46 | 30 |
| 11 | 59 | 7  | 55 | 10 | 58 | 6  | 54 |
| 43 | 27 | 39 | 23 | 42 | 26 | 38 | 22 |

IMAGE SCANNING METHOD AND APPARATUS THEREOF

BACKGROUND OF THE INVENTION

The present invention relates to an image scanning method and an apparatus thereof, which read characters, figures, photographs and so forth on a document and process the read data and display the result on a display.

DESCRIPTION OF THE RELATED ART

When a scanner reads an image on a document, the scanner reads the image by dividing the image into fine dots. The resolution means that the image is read by what number of fine dots by which the image is divided into, and usually is expressed in dpi (dots per inch) denoting the number of dots per inch. For example, 300 dpi means that the image is read by that one inch length of the image is divided into 300 pieces of dot.

At a conventional image scanning method, a scanner makes a document reading section (document reading head) move and reads a whole image at one time scanning as image data of designated resolution, for example, 600 dpi. And the image data are transferred to a personal computer in the read order. The personal computer processes the image data in the transferred order and makes the image display on a display.

However, generally at the time between the image is read and the image is displayed, the transferring time of the image data from the scanner to the personal computer becomes problem. That is, it takes a great deal of time to transfer the image data read at the scanner to the personal computer. Accordingly, from the time the image is read to the image is displayed is dependant on the transferring time of the image data.

As mentioned above, in the conventional image scanning method, the scanner reads the whole image by one time scanning and transfers the entire read image data in the read order to the personal computer. Consequently, the transfer time of the whole image data becomes long and the time from scanning to displaying the whole image on the display also becomes long. Therefore, it takes a long time for a user to confirm the whole image by displaying. For example, the following cases occur, a corner of the document is lost by a mistake of setting the reading size or reading position, an image of desirable resolution is not obtained, and the face of the document is inverted. In these cases, the user recognizes the mistakes of image reading, however, there is a problem that it takes a long time for the user to recognize the mistakes.

SUMMARY OF THE INVENTION

It is therefore an object of the present invention to provide an image scanning method and an apparatus thereof, with which a user can recognize mistakes at document reading at earlier time.

According to a first aspect of the present invention, for achieving the objects, an image scanning method provides an image reading process that reads image data of lower resolution than fundamental resolution by one scanning, and an image displaying process that displays said image data of lower resolution as a preview image, and displays an image of higher solution than said preview image by rescanning.

According to a second aspect of the present invention, in the first aspect, an image scanning method further provides plural image reading processes that read image data by plural scanning, after displayed said preview image, and makes said preview image renew and making resolution of the preview image higher gradually.

According to a third aspect of the present invention, in the first aspect, said image reading process scans said image data by thinning out the image data of a document in designated intervals in a main scanning direction and a sub scanning direction, at the case that the image data of lower resolution than fundamental resolution are read.

According to a fourth aspect of the present invention, in the third aspect, said image reading process, at the case that the image data are thinned out, equally divides the document into plural blocks that have the designated number of pixels in the main scanning direction and the sub scanning direction, and reads the plural pixels in said blocks one pixel by one pixel, by scanning the number of times of the plural pixels in said blocks.

According to a fifth aspect of the present invention, in the fourth aspect, said image reading process reads plural pixels in the order that the read pixels are not only from one side.

According to a sixth aspect of the present invention, an image scanning apparatus provides a scanner that reads one image data whose resolution is lower than fundamental resolution by one time scanning and transfers said one image data in the read order, after this, by rescanning, reads another image data that is different from said one image data having lower resolution and transfers said another image data in the read order, and an image processing means, after received said one image data, makes said one image data display on a display as a preview image in the received order, and after received said another image data, makes said preview image renew to said another image having higher resolution in the received order, and makes said renewed image display on said display.

According to a seventh aspect of the present invention, in the sixth aspect, said scanner transfers the image data having lower resolution in the plural times by the plural times of scanning, and said image processing means renews the preview image to an image having higher resolution every transferring.

According to an eighth aspect of the present invention, in the sixth aspect, said scanner is capable of reciprocating and reads said image data in both ways going back and forth.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
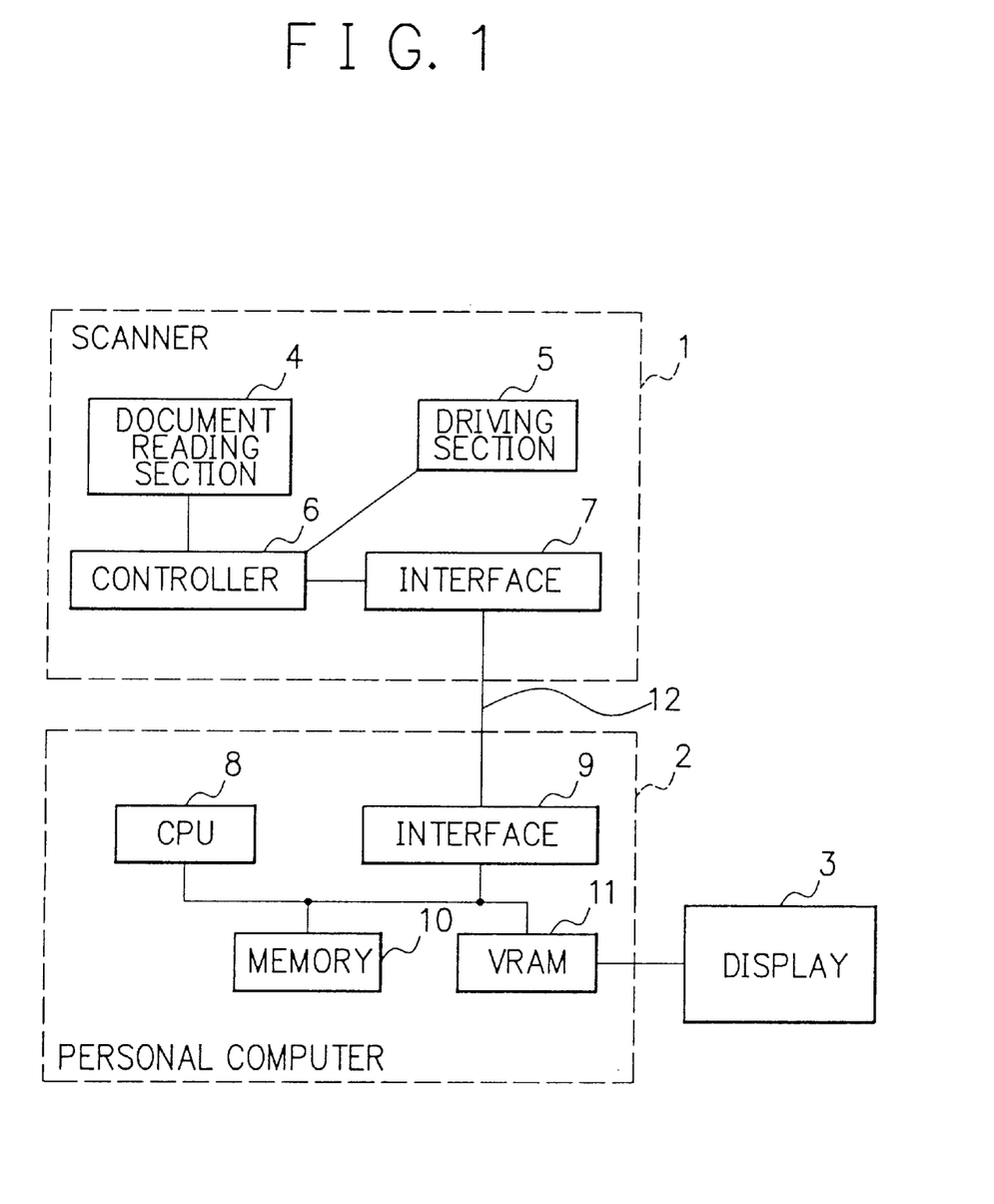
FIG. 1 is a block diagram showing a structure of a first embodiment of an image scanning apparatus of the present invention.

Referring now to the drawings, embodiments of the present invention are explained in detail. FIG. 1 is a block diagram showing a structure of a first embodiment of an image scanning apparatus of the present invention. As shown in FIG. 1, the first embodiment of the image scanning apparatus of the present invention is constituted of a scanner 1 which scans a document and reads an image on the document and a personal computer 2 which processes the image read at the scanner 1 and makes the processed image display on a display 3. In this, the scanner 1 in FIG. 1 is a document fixing type scanner for personal computer.

The scanner 1 provides a document reading section 4 that is generally named as a document reading head, a driving section 5, a controller 6 and an interface 7. In this, the document reading section 4 reads an image by reflection light from the document at a light receiving element such as a charge coupled device (CCD). The document reading section 4 reads the whole image by that the document moves to a sub scanning direction while the image of a main scanning direction of the document is read. This document reading section 4 is capable of reciprocating movement and can read the image at both ways going back and forth.

The driving section 5 drives the document reading section 4 through the controller 6. The controller 6 controls a reading operation of the document reading section 4 and a transferring operation of the image data to the personal computer 2. The interface 7 is an interface transferring the image data to the personal computer 2 through a communication cable 12.

The scanner 1 of the first embodiment of the present invention has a function that reads the image data by thinning out the image data in the main scanning direction and the sub scanning direction. In order to realize the thinning out of the image data of the main scanning direction, the scanner 1 has a function that takes out only the image data positioned between designated intervals from the image data read at the document between designated intervals from the image data read at the document reading section 4. In order to realize the thinning out of the image data of the sub scanning direction, the scanner 1 has a function that takes out only the image data of selected lines from the image data read at the document reading section 4.

The personal computer 2 provides a central processing unit (CPU) 8, an interface 9, a memory 10 and a video random access memory (VRAM) 11. The CPU 8 makes the memory 10 memorize the image data transferred from the scanner 1 and also controls such as a writing process of the image data to the VRAM 11. The interface 9 receives the image data from the scanner 1 through the communication cable 12. The memory 10 memorizes the image data and the VRAM 11 is a RAM memorizing only the image data displaying on the display 3.

The personal computer 2 of the first embodiment of the present invention, when the scanner 1 receives low resolution image data thinned out by one time scanning, makes the display 3 display the low resolution image data as a preview image. After this, this personal computer 2 makes the display 3 display gradually high resolution image being successive preview image by plural times scanning.

Figure 2A:
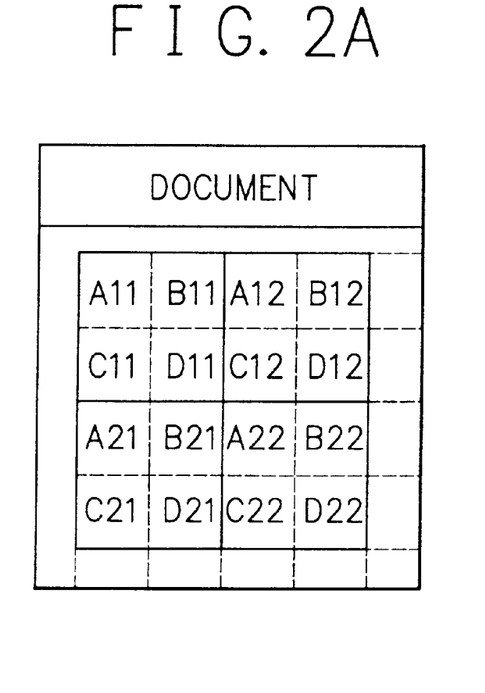
FIG. 2A is a diagram showing a document that is divided into regions.
Figure 2B:
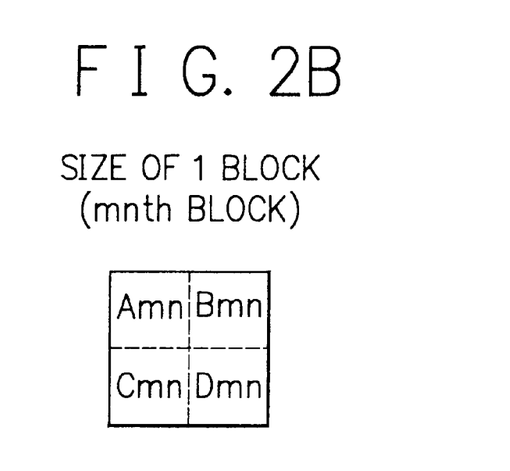
FIG. 2B is a diagram showing a structure of a block.
Figure 2C:
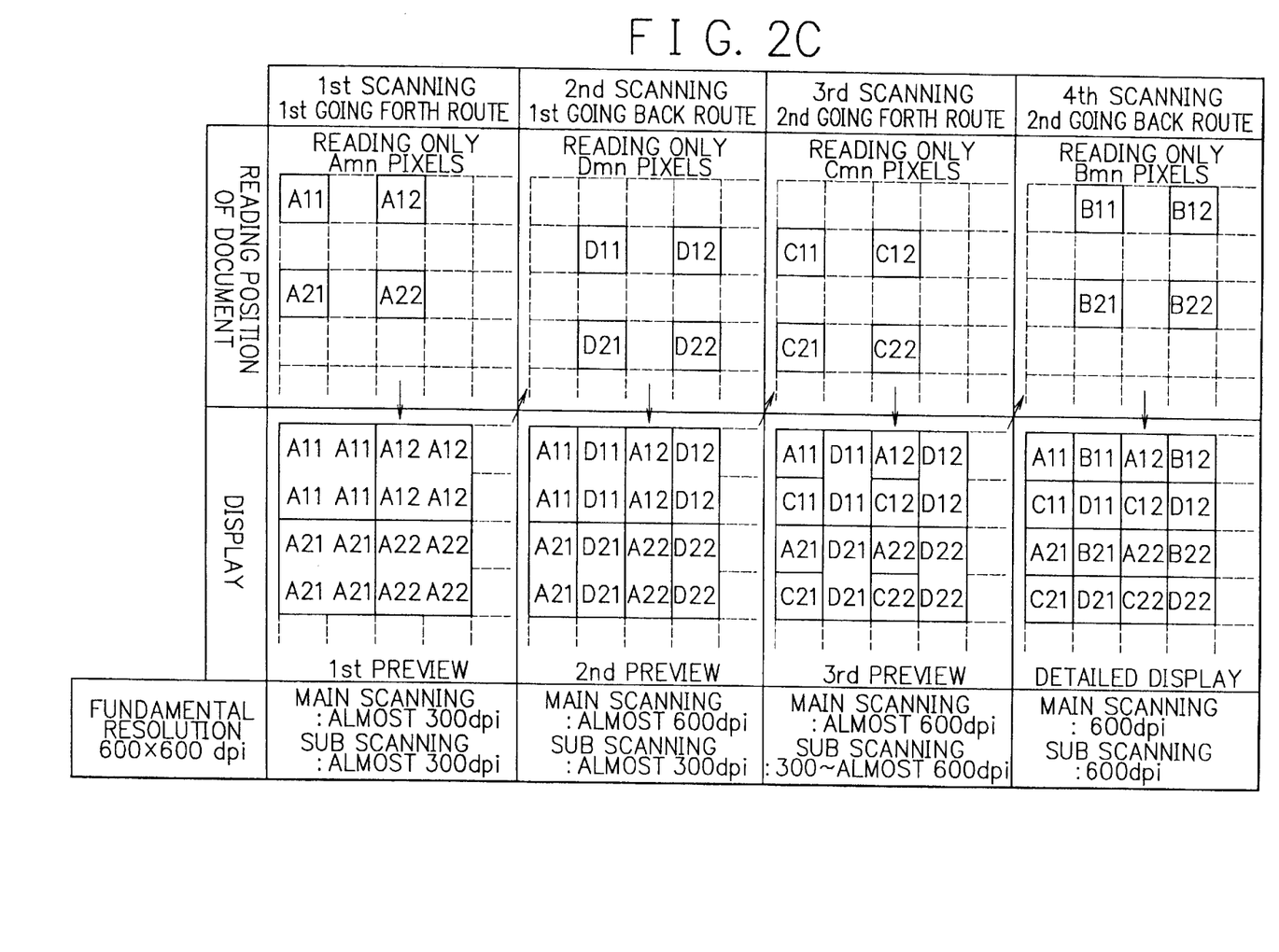
FIG. 2C is a diagram showing an image reading operation of the first embodiment of an image scanning method of the present invention.

Next, an operation of the first embodiment of the present invention is explained. FIG. 2A is a diagram showing a document that is divided into regions. FIG. 2B is a diagram showing a structure of a block. FIG. 2C is a diagram showing an image reading operation of the first embodiment of an image scanning method of the present invention. First, the concept of a block being a premise for explaining the thinning out operation of an image data is explained. As shown in FIG. 2A, a face to be read of a document is divided into regions of suitable size shaped square or rectangle. This region is called a block. As shown in FIG. 2B, the size of one block is a region composed of 2 pixels in the main scanning direction and 2 pixels in the sub scanning direction. And in this one block, four pixels Amn, Bmn, Cmn and Dmn are included. This block is called a mn th block being at a m th in the main scanning direction and at n th in the sub scanning direction. In this, m and n are integers, such as m and n are 1, 2, 3.

The scanner 1 reads the image data of four pixels in the block by reading four times, one reading for one pixel. The document reading section 4 in the scanner 1 reads the image data at both ways going back and forth, therefore by the two times of the reciprocating movement, the four times of scanning are performed, then the image data of four pixels can be read.

At this first embodiment, the maximum resolution that the scanner 1 can read is named as the fundamental resolution.

At a first scanning (a first going forth route), the document reading section 4 in the scanner 1 is driven by the driving section 5 through the controller 6 and reads image data of Amn pixels positioned at the left upper part of each block as shown at the upper part in FIG. 2C. Consequently, the scanner 1 reads the image data by thinning out the image data of Bmn, Cmn and Dmn pixels. This image data of Amn pixels are transferred to the interface 9 in the personal computer 2 from the interface 7 in the scanner 1 through the communication cable 12 in the read order. And the image data are taken in the personal computer 2.

Generally, it takes long time to transfer the image data from the scanner 1 to the personal computer 2. However, in this first embodiment, at the first scanning, the image data read at the scanner 1 are the image data of Amn pixels, and the image data of Bmn, Cmn and Dmn pixels are thinned out. Therefore the amount of the image data read at the scanner 1 is 25% of the document, and the transferring time of the image data is reduced to about ¼ of that of the image data of the fundamental resolution.

When the interface 9 in the personal computer 2 receives the image data from the scanner 1, the CPU 8 in the personal computer 2 makes the memory 10 memorize the received image data in the received order and writes the received image data in the VRAM 11. The image data written in the VRAM 11 are displayed on the display 3 as a preview image.

As shown at the lower part in FIG. 2C, this preview image is an image that the image data in each block are expressed by the image data of Amn pixels. Accordingly, the preview image is the image that the image data of the fundamental resolution are thinned out to ¼, then the preview image is coarser than the image of the fundamental resolution. However, as mentioned above, the transferring time of the image data is about ¼ of that of the image data of the fundamental resolution, therefore a user can recognize the whole image at earlier time. The preview image of the image data thinned out to 25% at this step is defined as a first preview.

Next, when the first scanning is finished and the document reading section 4 in the scanner 1 reaches the end of the document, the document reading section 4 is driven by the driving section 5 to the opposite direction. And then a second scanning (a first going back route) is successively performed. At the second scanning, as shown at the upper part in FIG. 2C, the document reading section 4 in the scanner 1 reads Dmn pixels positioned at the right lower part of each block. Consequently, the scanner 1 reads the image data thinned out Amn, Bmn and Cmn pixels in each block. As the same as the first scanning, the image data of Dmn pixels are transferred to the interface 9 in the personal computer 2 through the communication cable 12 in the read order and taken in the personal computer 2. The transferring time of the image data of Dmn pixels is also reduced to about ¼ of that of the image data of the fundamental resolution.

When the interface 9 in the personal computer 2 receives the image data from the scanner 1, the CPU 8 in the personal computer 2 makes the memory 10 memorize the received image data in the received order and writes the received image data in the VRAM 11. In the VRAM 11, the image data of Amn pixels have been already written at the first scanning, therefore the state becomes that the image data of both Amn and Dmn pixels have been written. When the image data of Amn and Dmn pixels are written in the VRAM 11, the preview image is renewed to a more accurate preview image than the first preview image that is displaying.

As shown at the lower part in FIG. 2C, this preview image is the image that each block is expressed by the image data of two pixels Amn and Dmn. That is, this preview image is the image whose resolution in the main scanning direction is higher than the first preview. This preview image of 50% of the image data is defined as a second preview.

Next, when the second scanning is finished and the document reading section 4 in the scanner 1 reaches the end of the document, the document reading section 4 is driven by the driving section 5 to the opposite direction. And then a third scanning (a second going forth route) is successively performed. At the third scanning, as shown at the upper part in FIG. 2C, the document reading section 4 in the scanner 1 reads Cmn pixels positioned at the left lower part of each block. Consequently, the scanner 1 reads the image data thinned out Amn, Bmn and Dmn pixels in each block. As the same as the first and second scanning, the image data of Cmn pixels are transferred to the interface 9 in the personal computer 2 through the communication cable 12 in the read order and taken in the personal computer 2. The transferring time of the image data of Cmn pixels is also reduced to about ¼ of that of the image data of the fundamental resolution.

When the interface 9 in the personal computer 2 receives the image data from the scanner 1, the CPU 8 in the personal computer 2 makes the memory 10 memorize the received image data in the received order and writes the received image data in the VRAM 11. In the VRAM 11, the image data of Amn pixels and Dmn pixels have been already written at the second scanning, therefore the state becomes that the image data of Amn, Cmn and Dmn pixels have been written. When the image data of Amn, Cmn and Dmn pixels are written in the VRAM 11, the preview image is renewed to a more accurate preview image than the second preview image that is displaying.

As shown at the lower part in FIG. 2C, this preview image is the image that each block is expressed by the image data of three pixels Amn, Cmn and Dmn. That is, this preview image is the image whose resolution in a part of the sub scanning direction is higher than the second preview. This preview image of 75% of the image data is defined as a third preview.

Further, when the third scanning is finished and the document reading section 4 in the scanner 1 reaches the end of the document, the document reading section 4 is driven by the driving section 5 to the opposite direction. And then a fourth scanning (a second going back route) is successively performed. At the fourth scanning, as shown at the upper part in FIG. 2C, the document reading section 4 in the scanner 1 reads Bmn pixels positioned at the right upper part of each block. Consequently, the scanner 1 reads the image data thinned out Amn, Cmn and Dmn pixels in each block. As the same as the first, second and third scanning, the image data of Bmn pixels are transferred to the interface 9 in the personal computer 2 through the communication cable 12 in the read order and taken in the personal computer 2. The transferring time of the image data of Bmn pixels is also reduced to about ¼ of that of the image data of the fundamental resolution.

When the interface 9 in the personal computer 2 receives the image data from the scanner 1, the CPU 8 in the personal computer 2 makes the memory 10 memorize the received image data in the received order and writes the received image data in the VRAM 11. In the VRAM 11, the image data of Amn pixels, Cmn pixels and Dmn pixels have been already written at the third scanning, therefore the state becomes that the image data of Amn, Bmn, Cmn and Dmn pixels have been written. When the image data of Amn, Bmn, Cmn and Dmn pixels are written in the VRAM 11, the preview image is renewed to a more accurate preview image than the third preview image that is displaying.

As shown at the lower part in FIG. 2C, this preview image is the image that each block is expressed by the image data of four pixels Amn, Bmn, Cmn and Dmn. That is, this preview image is the image whose resolution in a part of the sub scanning direction is higher than the third preview. This preview image of 100% of the image data is the image of the fundamental resolution and defined as a detailed display. At this step, the image reading of one sheet of the document is completed.

Figure 3:
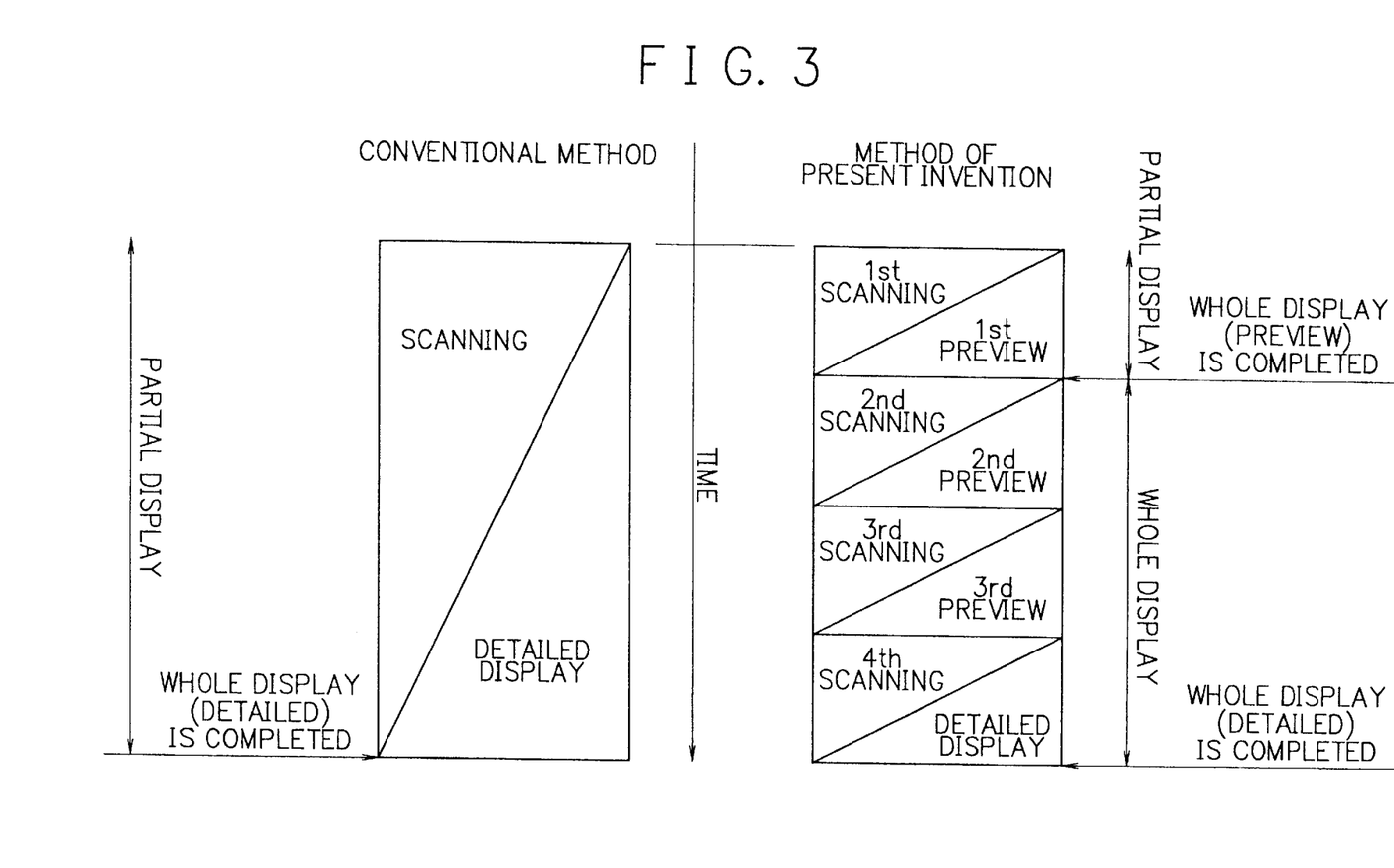
FIG. 3 is a diagram showing states and time of image displays at the case comparing the image scanning method of the first embodiment of the present invention with the conventional image scanning method.

FIG. 3 is a diagram showing states and time of image displays at the case comparing the image scanning method of the first embodiment of the present invention with the conventional image scanning method. As mentioned above, at the time from the image is read to the image is displayed on the display 3, the obstacle of speed is caused by the transferring time of the image data from the scanner 1 to the personal computer 2. The amount of data (the number of pixels) that the scanner 1 transfers is the same at the image scanning method of the present invention and the conventional image scanning method at one sheet of document. Therefore, as shown in FIG. 3, the time from the image is read to the image is displayed on the display is almost the same at the both methods.

At the image scanning method of the present invention, although the image is coarse (the first preview), the whole image can be displayed in about ¼ time of the conventional image scanning method, at the time from the image is started to read to the whole image is displayed. Therefore a user can confirm the whole image in earlier time.

Moreover, if the user judges that the image at the first preview or the second preview or the third preview, which is the image at the previous step of the image data of the fundamental resolution, is enough, the user can stop the image reading and can make the image at that step store. For example, at the case that the image of required resolution is obtained at the second preview after the second scanning is finished, at that time, the user can stop the image reading. In this case, the image reading time is a half of that of the fundamental resolution.

As mentioned above, according to the first embodiment of the present invention, the whole image can be displayed in short time as the preview image, therefore the user can confirm a mistake at the document reading in earlier time, as a result, the time until the user needs for rereading the document can be reduced.

Moreover, the thinned out image data are read at each step and the image data are displayed at each step, therefore the user can easily obtain the image of the required resolution.

And, the order reading plural pixels in each block is made to be diagonal, that is, the read pixels are not made to be only one side, a preview image having uniformity can be obtained.

Furthermore, it is not necessary to add hardware such as a memory for the personal computer, therefore the apparatus can be realized in low cost.

Figure 4A:
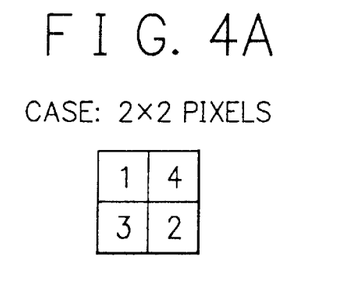
FIG. 4A is a diagram showing a block size in case that the number of pixels is 4.
Figure 4B:
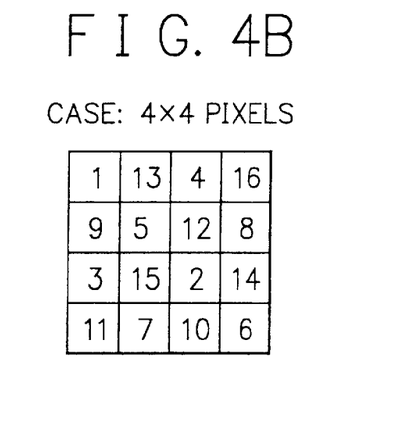
FIG. 4B is a diagram showing a block size in case that the number of pixels is 16.
Figure 4C:
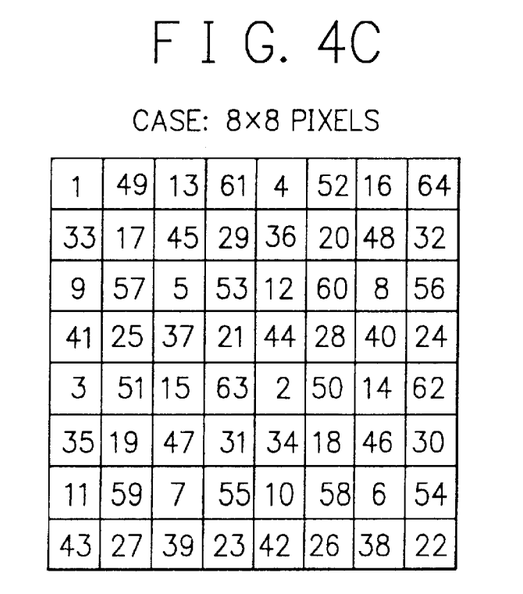
FIG. 4C is a diagram showing a block size in case that the number of pixels is 64.

Next, a second embodiment of the image scanning method of the present invention is explained. FIGS. 4A, 4B and 4C are diagrams showing block sizes in cases that the number of pixels is 4, 16 and 64. At the first embodiment of the present invention, the one block is constituted of 2 pixels in the main scanning direction and 2 pixels in the sub scanning direction and the number of pixels in one block is set to be 4. However, the one block is not limited to this construction, the number of pixels in one block can be set to 16 (4 pixels in the main scanning direction and 4 pixels in the sub scanning direction) or 64 (8 pixels in the main scanning direction and 8 pixels in the sub scanning direction).

In FIGS. 4A, 4B and 4C, each number put in pixels is the order that the scanner 1 reads by scanning. For example, the pixel in which the number 5 is put is read at the fifth scanning.

Even at the case that the size of one block is arbitrary, the same effect as the first embodiment can be obtained at the second embodiment. However, at the case that the size of one block is made to be large, the thinning out ratio of the image data becomes large. Consequently, the time from reading the image data to displaying the whole image at the first preview becomes short, but the number of times that the scanner 1 scans the document becomes large, due to the number of pixels including in one block is large. Therefore, the one scanning time must be shortened and the performance of mechanical components such as a motor in the driving section 5 must be improved. Accordingly, the size of the one block has some limitation depending on the performance of the driving section 5.

At the first and second embodiments, the document reading section 4 in the scanner 1 is capable of reciprocating and is made to move back and forth to read the document. However, it is possible that the document is read by only one way scanning.

At the case that the reading speed of the document reading section 4 in the scanner 1 is faster than the transferring speed of the image data from the scanner 1 to the personal computer 2, a memory is installed in the scanner 1 and the scanner 1 reads the one page of the image data at the one time scanning and makes the memory memorize the image data, instead of reading the image data in the plural times of scanning. After this, the same operation mentioned in FIG. 2 is performed. With this the same image scanning operation is realized.

As mentioned above, according to the present invention, the image data is read as an image data of lower resolution than the fundamental resolution by the one time scanning and this image data of lower resolution is displayed as a preview image. And by rescanning, an image data of higher resolution than the preview image is displayed. Therefore, the user can recognize a mistake of the document reading at earlier time, as a result, the time when the user performs the rereading of the document can be reduced.

According to the present invention, after the preview image is displayed, by the plural times of scanning, the resolution of the preview image is gradually made to be higher, therefore the user can easily obtain the image of the required resolution.

According to the present invention, the reading of the image data of the lower resolution than the fundamental resolution is performed by thinning out the image data at designated intervals in the main scanning direction and the sub scanning direction. Therefore, the hardware such as a memory is not needed to add in the personal computer and the image scanning apparatus can be obtained in low cost.

According to the present invention, the thinning out of the image data is performed by the following operation. First, the document is equally divided into plural blocks with designated number of pixels in the main scanning direction and the sub scanning direction. Then, by scanning, plural pixels in the block are read one pixel by one pixel in the number of times being the number of plural pixels in each block. Therefore, the preview image of uniform resolution can be obtained.

According to the present invention, the order reading plural pixels in each block is made to be in the diagonal direction, that is, not to be only one side, the preview image of more uniform resolution can be obtained.

According to the present invention, at the scanner, by one time scanning, one image data being lower resolution than the fundamental resolution is read and the one image data are transferred in the read order. After this, by rescanning, another image data being different from the one image data are read and another image data are transferred in the read order. After the one image data are received at the personal computer, the CPU makes the one image data display on a display in the received order as a preview image, and after this, another image data are received, the one image data are renewed to another image data that has higher resolution and the renewed image data are displayed as the preview image in the received order. Therefore the user can recognize mistakes in reading in earlier time.

According to the present invention, by the scanner is made to scan plural times, the image data that has low resolution are transferred plural times. And every transferring time, the preview image is renewed to the image being higher resolution. Therefore, the user can obtain the image of required resolution.

According to the present invention, the scanner is capable of reciprocating. And the image data can be read in both ways going back and forth of the scanner, therefore the reading operation can be performed in high efficiency.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image scanning method, comprising:
    reading an image data of lower resolution than a fundamental resolution by a first scanning;

displaying said image data of lower resolution as a preview image;

rescanning said image data;

displaying an image of higher resolution than said preview image;

reading said image data a plurality of times by a plurality of scanning, after displaying said preview image; and displaying said preview image at a higher resolution incrementally.

2. The method in accordance with claim 1, wherein:

said plural readings read said image data by thinning out the image data of a document in designated intervals in a main scanning direction and a sub scanning direction.

3. The method in accordance with claim 2, wherein:

said thinning out equally divides the document into plural blocks having designated number of pixels in the main scanning direction and the sub scanning direction and said plural reading read the designated number of pixels in said plural blocks, one pixel by one pixel.

4. The method in accordance with claim 3, wherein:

said image data are read from a plurality of different sides.

5. An image scanning apparatus, comprising:

a scanner that reads an image data having a resolution which is lower than a fundamental resolution during a first scanning and transfers said image data in the read order and reads another image data that is different from said image data and transfers said another image data in the read order; and an image processor, said processor processing said image data and said another image data to create a preview image on a display in the received order of the image data and the another image data wherein said preview image increases in resolution after subsequent processing of said another image data.

6. The apparatus in accordance with claim 5, wherein:

said scanner transfers the image data having lower resolution a plurality of times; and said image processor renews the preview image to a higher resolution after subsequent transfers.

7. The apparatus in accordance with claim 5, wherein:

said scanner reads said image data in a plurality of directions.

8. An image scanning method, comprising:

reading an image data of lower resolution than a fundamental resolution by a first scanning;

displaying said image data of lower resolution as a preview image;

rescanning said image data;

displaying an image of higher resolution than said previous image;

said reading reads said image data by thinning out the image data of a document in designated intervals in a main scanning direction and a sub scanning direction; and said thinning out equally divides the document into plural blocks having a designated number of pixels in the main scanning direction and the sub scanning direction and said reading reads the designated number of pixels in said plural blocks, one pixel by one pixel.

9. The method in accordance with claim 8, wherein:

said image data are read from a plurality of different sides.

* * * * *